June 2, 1925. 1,540,565
P. B. PELTO
AUTOMATIC STARTER FOR MOTOR DRIVEN VEHICLES
Filed July 17, 1924 2 Sheets-Sheet 1

Inventor
Peter B. Pelto
By
Attorney

June 2, 1925.
P. B. PELTO
1,540,565
AUTOMATIC STARTER FOR MOTOR DRIVEN VEHICLES
Filed July 17, 1924      2 Sheets-Sheet 2
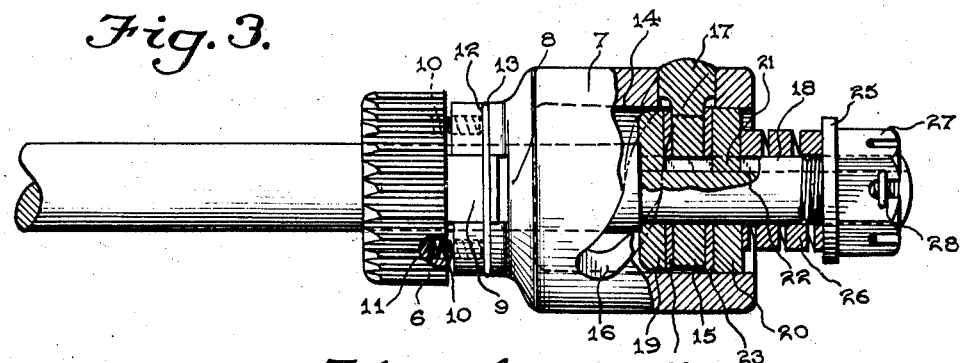
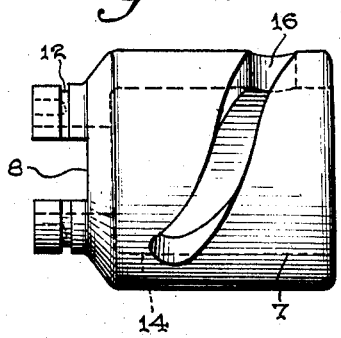
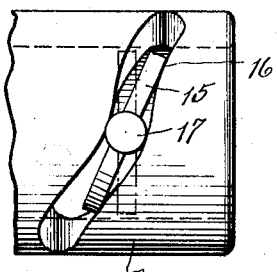
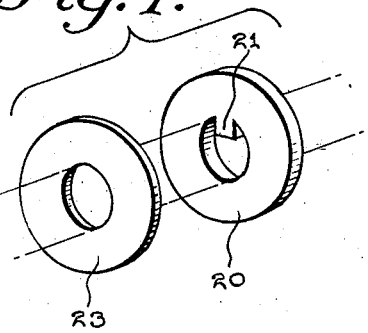
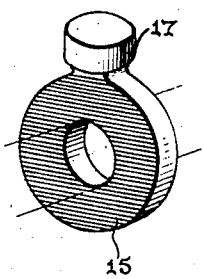
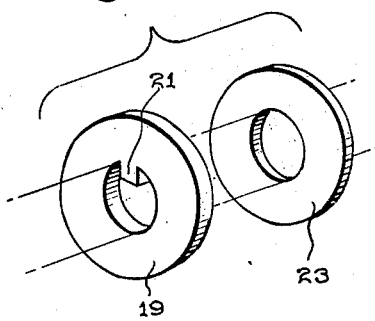
Inventor
Peter B. Pelto
By [signature]
Attorney Patented June 2, 1925.

1,540,565

UNITED STATES PATENT OFFICE.

PETER B. PELTO, OF DETROIT, MICHIGAN.

AUTOMATIC STARTER FOR MOTOR-DRIVEN VEHICLES.

Application filed July 17, 1924. Serial No. 726,592.

*To all whom it may concern:*

Be it known that I, PETER B. PELTO, a citizen of the United States of America, residing at Detroit, in the county of Wayne and State of Michigan, have invented new and useful Improvements in Automatic Starters for Motor-Driven Vehicles, of which the following is a specification.

The present invention has for its purpose to provide, in an automatic starter for motor-driven vehicles, a simple and practical construction for effecting the starting of a motor-driven vehicle through the medium of friction and camming means operatively connecting a starting motor shaft and a sleeve which carries a starting gear for effecting engagement of the starting gear with a gear on the automobile drive shaft.

Another purpose is to minimize the tendency to strip the teeth of the gears and to insure substantially instant disengagement of the starting mechanism from the automobile motor drive shaft when said shaft has started to function.

Still another purpose is to provide yielding means to maintain sufficient friction between the elements connecting the sleeve and the starting motor shaft, the friction being such as to permit of a partial movement of the sleeve when the starting motor shaft starts to turn, and a complete movement of the sleeve in case of back-fire, said yielding means also avoiding jamming of the various elements of the starting mechanism and also acting to permit the frictional connections to yield upon the return of the sleeve to its initial position subsequently to starting the motor shaft.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 3 is an enlarged sectional view of the clutch connections between the starting motor shaft and a gear or pinion mounted on said shaft.

Figure 4 is an enlarged detail view of the sleeve showing its spiral cam slot.

Figure 5 is an enlarged view of the drive member which is mounted upon the starting motor shaft and provided with a radial projection which engages in the spiral slot.

Figure 6 is a detail view of adjacent drive disks.

Figure 7 is a detail view of the other disks 20 and 23.

Figure 8 is a detail view of the sleeve 7.

Figure 1:
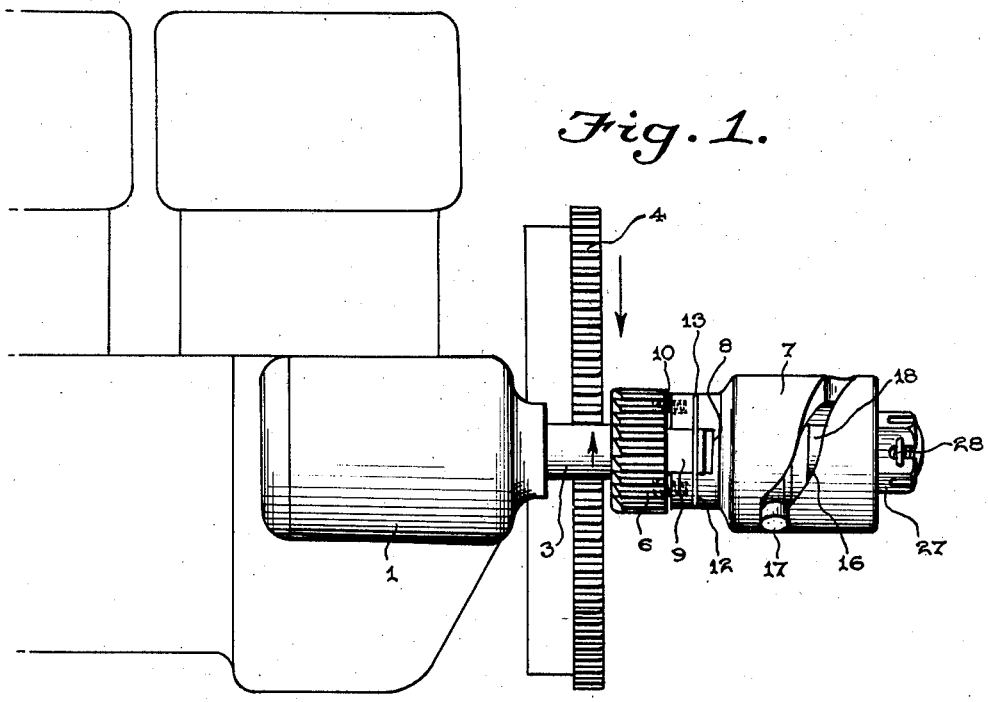
Figure 1 is a view in side elevation of a portion of a conventional automobile motor and a starting motor therefor, showing the starting mechanism applied, the same being in an inoperative or unconnected position.
Figure 2:
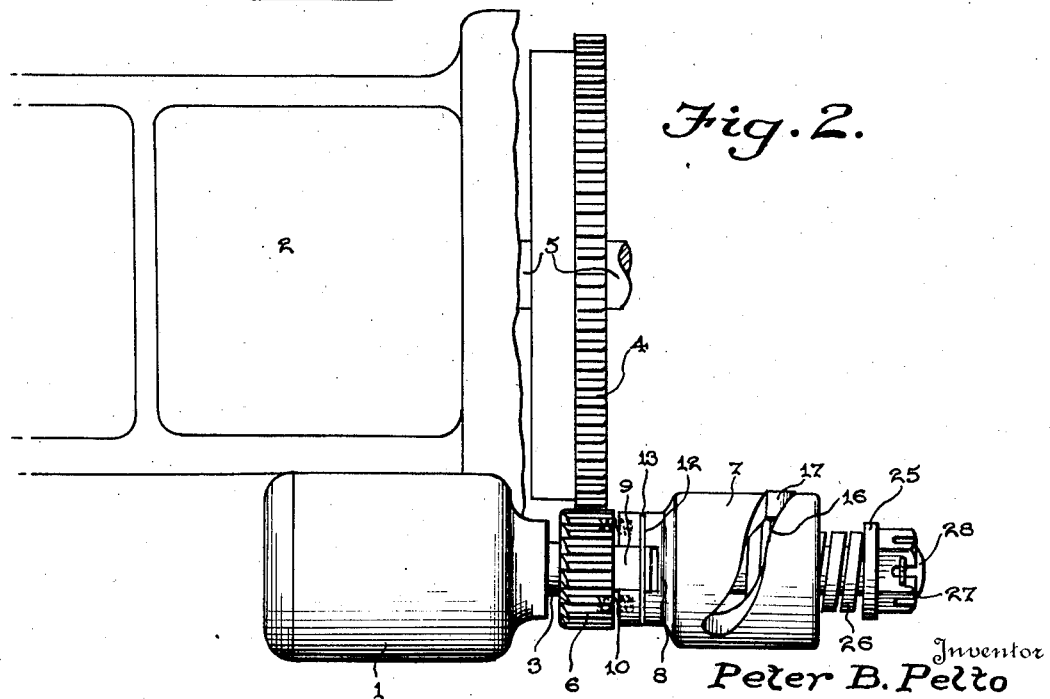
Figure 2 is a plan view of Figure 1, showing the starting mechanism in an operative position.

Referring to the drawings, 1 is a starting motor which is usually electrically operated, 2 is the automobile motor and 3 denotes the starting motor or armature shaft while 4 is a spur gear operatively mounted upon the automobile motor shaft 5. Mounted for sliding movement on the starting motor shaft 3 is a gear 6 adapted, when moved sufficiently on the shaft 3, to mesh with the spur gear 4 of the automobile motor shaft in order to effect rotation of the latter.

When effecting a meshing engagement of gears by the sliding of one into engagement with the teeth of the other, the gears are not always aligned so that their teeth will properly mesh, without danger of stripping the teeth of one gear or the other. In order to minimize the tendency of the stripping of the teeth, a sleeve 7 is mounted on the starting motor shaft and one end thereof has diametrically opposite recesses 8 to receive diametrically opposite lugs 9 of the gear 6, there being springs 10 interposed between the gear 6 and the end of the sleeve. These coil springs yield when effecting a meshing engagement of the gear 6 with the gear 4 of the automobile motor drive shaft, thereby relieving the tendency toward stripping the teeth of one gear or the other. The coil springs 10 are mounted in registering bores or recesses 11 of the adjacent faces of the gear 6 and the sleeve 7.

A reduced end of the sleeve 7 has an annular groove 12 which receives a spring wire retainer 13 which, at diametrically opposite points, overlies the lugs 9 which, due to the terminal ribs on the lugs, are prevented from disengagement with the diametrically opposite recesses 8. The sleeve 7 is counterbored, as shown at 14, and received therein is a drive member 15. The sleeve has a spiral slot 16 which receives a projection 17 carried by the drive member. The drive member is mounted on the reduced end 18 of the starting motor shaft. Also mounted in the counterbore 14 of the sleeve are disks 19 and 20 through which the reduced end 18 of the starting motor shaft engages, there being keys 21 carried by the disks 19 and 20 to engage the keyway 22 of the starting motor shaft, so that the disks 19 and 20 will rotate with the shaft when effecting the meshing engagement of the gear 6 with the gear 4.

Interposed between the driving member 15 and the disks 19 and 20 are fiber disks 23 with which the disks 19 and 20 frictionally engage and, due to the driving member being roughened or serrated upon its opposed faces, the fiber disks will rotate with the driving member in effecting a movement of the sleeve. Due to the disks 19 and 20 having frictional but slight yielding engagement with the fiber disks 23, it is possible to effect a meshing engagement of the gear 6 with the gear 4 and additionally minimize the possibility of the stripping of the teeth.

Mounted upon the terminal portion of the reduced end 18 of the starting motor shaft is a washer 25 and interposed between the washer and the disk 20 is a relatively high tensioned coil spring 26, there being a nut 27 threaded on the extremity of the reduced portion 18 of the starting motor shaft to hold the washer in position. The nut 27 is provided with a plurality of diametrically opposite teeth with which the ends of a transverse pin 28 engage, the pin passing transversely of the shaft and acting to prevent displacement of the nut. The spring 26 insures friction between the driving disks 23 and the disks 19 and 20 and permits of a partial yielding movement of the sleeve when the starting motor shaft starts to turn, and allows a complete yielding movement of the sleeve in case of back-fire, friction being still maintained between the disks 23 and the disks 19 and 20.

With the elements of the automatic starter for motor driven vehicles in the positions indicated in Figure 1, it being the purpose to move the gear or pinion 6 into mesh with the driving gear 4, a movement of the sleeve of the starting motor shaft would effect the desired engagement of the gears. This would occur under ordinary conditions were it not for the fact that the engagement of the ends of the teeth or the failure of the teeth to register with the spaces between the teeth of the driving gear is liable, in practice, to cause the stripping of the teeth or injury thereto to such an extent as to destroy their utility. Obviously, by using the springs 10 and permitting frictional but slight movable engagements between the disks 19 and 20 and the fiber disks 23 and the fact that the gear 6 may slide yieldably relative to the sleeve, the tendency of stripping the teeth is relieved as the yielding means and slidable frictional engagement of communicating motion from the sleeve to the gear 6 are employed to permit of the advance of the sleeve without forcing the pinion to such an extent as to result in such injury.

When the sleeve is advanced automatically by the impulses of the starting motor through its armature shaft and by the frictional engagement between the disks 19 and 20 and 23 and also through the action of the projection 17 in the spiral groove of the sleeve, engagement of the pinion with the gear, in the event that an accurate meshing of the teeth does not occur, results merely in the repression of the pinion or gear 6 against the tension of the springs 10 until further turning of the pinion or gear which rotates with the sleeve is effected, whereupon the springs 10 quickly advance the pinion or gear 6 into a meshed relation with the gear 4. When the operation of the starting motor shaft has resulted in the starting of the automobile motor shaft and the gear 4 then receiving its motion from the automobile motor shaft, the revoluble movement being more rapid than the movement of the gear or pinion 6, the effect of such transmission of motion to the pinion and from it to the sleeve, owing to the engagement of the projection 17 in the spiral slot 16, causes movement of the sleeve from the plane of the gear 4 and hence the disengagement of the pinion or gear 6 from the gear 4. This disengagement will instantly occur due to the interlocked sliding connection between the sleeve and the gear or pinion 6.

In constructing and assembling the automatic starter for motor-driven vehicles, in actual practice, the driving member 15 is made small enough in thickness to permit of a clearance of approximately one-eighth of an inch between the opposite faces of the disk portion of the driving member and the walls of the spiral slot in the sleeve. Furthermore, the diameter of the driving member is to be such, approximately one-thirty-second of an inch less than the counterbore of the sleeve, to permit the driving member to be turned in the bore of the sleeve after being inserted through the spiral slot. In assembling the parts of the automatic starter for motor-driven vehicles, the gear 6 and the sleeve 7 are first put on the starting motor or armature shaft. Then the disks 19 and 23 in Figure 6 are slipped over the shaft. The sleeve is then pulled out again sufficiently to permit the spiral slot to clear the end of the shaft, then the driving member is inserted through the spiral slot (its thickness being such as to permit sufficient clearance to allow this insertion), then the driving member is turned sufficiently to line up with the bore of the sleeve and the shaft. The shaft is then pushed through the opening in the driving member, after which the other disks 23 and 20 (Figure 7) are slipped over the shaft and into the bore of the sleeve, after which the spring 26 and its holding means are applied to the shaft.

The invention having been set forth, what is claimed is:

1. A motor starting mechanism having, in combination with a starting motor having a shaft and a drive gear in connection with an automobile motor shaft, a pinion carried by the starting motor shaft for intermeshing engagement with the drive gear, a device for controlling the operation of said pinion and having a sleeve with which the pinion has an interlocking and relatively sliding engagement, yielding means for communicating motion from the sleeve to the pinion, the sleeve having a spiral slot, a driving member on the starting motor shaft and provided with means engaging said spiral slot, and means on the starting motor shaft and having frictional connections with the drive member to permit a partial yielding movement of the sleeve when the starting motor shaft starts to turn and a complete yielding movement in case of back-fire, thereby preventing stripping of the teeth of the intermeshing gears.

2. The combination with an automobile motor shaft to be started, of a starting motor having a shaft, a gear sliding on the latter shaft and adapted to operatively gear to the automobile motor shaft, a sleeve slidable on the starting motor shaft and driving the gear, a driving member loose on the starting motor shaft and provided with a sliding cam engagement with the sleeve, and opposed clutch elements rotatable with the starting motor shaft and located on adjacent opposite faces of the driving member and provided with sliding frictional clutch engagements with the member for effecting a partial yielding movement of the sleeve when the starting motor shaft starts to turn and allowing a complete yielding movement in case of back-fire.

3. The combination with an automobile motor shaft to be started, of a starting motor having a shaft, a gear sliding on the latter shaft and adapted to operatively gear to the automobile motor shaft, a sleeve slidable on the starting motor shaft and driving gear, a driving member loose on the starting motor shaft and provided with a sliding cam engagement with the sleeve, opposed clutch elements rotatable with the starting motor shaft and located on adjacent opposite faces of the driving member and provided with sliding frictional clutch engagements with the member for effecting a partial yielding movement of the sleeve when the starting motor shaft starts to turn and allowing a complete yielding movement in case of back-fire, and means to insure said friction and allowing the sleeve to yield upon the return of the sleeve to its initial position, thereby relieving jamming or binding of the parts.

4. The combination with an automobile motor shaft to be started and having a drive gear thereon, of a starting motor shaft having a gear adapted to mesh with the first gear, a sleeve on the starting motor shaft and operatively connecting with its gear, the sleeve being slidable to effect a meshed engagement of the gears, the sleeve having a spiral slot, a drive member loose upon the starting motor shaft and provided with means engaging the spiral slot so that, upon rotation of the motor starting shaft, the sleeve slides in a direction toward the plane of the first gear, and clutch members splined on the starting motor shaft and provided with frictional and toothed connection with the driving member to cause the latter to transmit motion to the sleeve.

5. The combination with an automobile motor shaft to be started and having a drive gear thereon, of a starting motor shaft having a gear adapted to mesh with the first gear, a sleeve on the starting motor shaft and operatively connecting with its gear the sleeve being slidable to effect a meshed engagement of the gears, the sleeve having a spiral slot, a drive member loose upon the starting motor shaft and provided with means engaging the spiral slot so that, upon rotation of the motor starting shaft, the sleeve slides in a direction toward the plane of the first gear, clutch members fixed on the starting motor shaft and provided with frictional and toothed connections with the driving member to cause the latter to transmit motion to the sleeve, and spring means on the starting motor shaft for urging pressure on the clutch members to insure frictional and toothed connection with the drive members and permitting of a partial yielding movement of the sleeve when the starting motor shaft starts to turn and permitting a complete yielding movement in case of back-fire.

In testimony whereof he affixes his signature.

PETER B. PELTO.